US009194301B2

(12) United States Patent
Parente

(10) Patent No.: US 9,194,301 B2
(45) Date of Patent: Nov. 24, 2015

(54) PROTECTING THE OPERATING MARGIN OF A GAS TURBINE ENGINE HAVING VARIABLE VANES FROM AERODYNAMIC DISTORTION

(75) Inventor: Wayne P. Parente, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 591 days.

(21) Appl. No.: 13/487,585

(22) Filed: Jun. 4, 2012

(65) Prior Publication Data

US 2013/0319009 A1 Dec. 5, 2013

(51) Int. Cl.
*F02C 9/20* (2006.01)
*F01D 17/16* (2006.01)
*F02C 7/057* (2006.01)
*F01D 17/00* (2006.01)

(52) U.S. Cl.
CPC . *F02C 9/20* (2013.01); *F01D 17/16* (2013.01); *F02C 7/057* (2013.01); *F01D 17/00* (2013.01); *F05D 2240/12* (2013.01); *F05D 2270/102* (2013.01); *F05D 2270/1022* (2013.01)

(58) Field of Classification Search
CPC .............. F05D 2270/101; F05D 2270/102; F05D 2270/1022; F05D 2270/10; F05D 2270/1024; F05D 2240/12; F02C 9/22; F02C 9/20; F02C 7/057; F01D 17/00; F01D 17/08; F01D 17/16–17/167
USPC ............ 60/39.23, 39.24, 794, 805; 415/1, 16, 415/17, 23, 33, 36, 48, 155, 118; 416/1, 61
See application file for complete search history.

(56) References Cited

U.S. PATENT DOCUMENTS

| 3,759,091 | A | * | 9/1973 | Reimer ...................... 73/112.06 |
| 3,797,233 | A | | 3/1974 | Webb et al. |
| 3,973,391 | A | | 8/1976 | Reed et al. |
| 4,242,864 | A | | 1/1981 | Cornett et al. |
| 4,768,338 | A | * | 9/1988 | Lindler et al. ............... 60/39.27 |
| 5,259,188 | A | * | 11/1993 | Baxter et al. ..................... 60/204 |
| 5,782,603 | A | * | 7/1998 | O'Brien et al. .................. 415/1 |
| 6,164,902 | A | * | 12/2000 | Irwin et al. ..................... 415/17 |
| 7,094,019 | B1 | | 8/2006 | Shapiro |
| 7,827,803 | B1 | * | 11/2010 | Wadia et al. ................... 60/772 |

(Continued)

FOREIGN PATENT DOCUMENTS

WO 2006017365 2/2006

OTHER PUBLICATIONS

Yuhas, Andrew J., John G. Williams, and William G. Steenken. Inlet Distortion for an F/A-18A Aircraft During Steady Aerodynamic Conditions up to 60 Angle of Attack. National Aeronautics and Space Administration, Dryden Flight Research Center, 1997.*
Steenken, William G., et al. An Inlet Distortion Assessment During Aircraft Departures at High Angle of Attack for an F/A-18A Aircraft. NASA Dryden Flight Research Center, 1997.*

(Continued)

*Primary Examiner* — Phutthiwat Wongwian
*Assistant Examiner* — Alain Chau
(74) *Attorney, Agent, or Firm* — Carlson, Gaskey & Olds, P.C.

(57) ABSTRACT

A method of protecting operating margin of the gas turbine engine includes calculating an aerodynamic distortion of air entering an inlet of a gas turbine engine that has a compressor section with variable vanes that are movable subject to a control parameter. The control parameter is selectively modified in response to the aerodynamic distortion.

18 Claims, 3 Drawing Sheets

(56) References Cited

U.S. PATENT DOCUMENTS

| | | |
|---|---|---|
| 8,087,870 B2 | 1/2012 | Flucker et al. |
| 2009/0297334 A1* | 12/2009 | Norris et al. ............... 415/49 |
| 2011/0056180 A1 | 3/2011 | Nomura et al. |
| 2011/0164967 A1 | 7/2011 | Elorza Gomez et al. |
| 2011/0167780 A1 | 7/2011 | Bowman et al. |

OTHER PUBLICATIONS

International Search Report and Written Opinion for International Application No. PCT/US2013/042559 completed on Mar. 14, 2014.
International Preliminary Report on Patentability for PCT Application No. PCT/US2013/042559 mailed Dec. 18, 2014.

* cited by examiner

PROTECTING THE OPERATING MARGIN OF A GAS TURBINE ENGINE HAVING VARIABLE VANES FROM AERODYNAMIC DISTORTION

STATEMENT REGARDING FEDERALLY SPONSORED RESEARCH OR DEVELOPMENT

This invention was made with government support under contract number F33657-99-D-2051 awarded by the United States Air Force. The government has certain rights in the invention.

BACKGROUND

This disclosure relates to a strategy for controlling operating margin of a compressor section of a gas turbine engine.

A compressor section of a gas turbine engine is typically operated with regard to a designed operating line over a range of compressor pressure ratios and mass airflows. The engine is normally operated in a regime such that there is an operating margin between the designed operating line and a maximum operating line beyond which operation of the compressor section may become unstable with regard to stall, surge or flutter.

Typically, the designed operating line is set according to predefined parameters that are input into a schedule that is used to control operation of the compressor section. For instance, the compressor section may include variable vanes that are movable subject to the schedule such that the operating margin is maintained across the operating regime of the aircraft. A challenge, however, in setting the schedule is that the predefined parameters are set according to the most extreme operating conditions that the engine is expected to experience. Often compressor designers must sacrifice engine fuel economy or component life to ensure safe operation under all these conditions.

SUMMARY

A method of protecting operating margin of a gas turbine engine according to an exemplary aspect of the present disclosure includes calculating an aerodynamic distortion of air entering an inlet of a gas turbine engine having a compressor section with variable vanes, the variable vanes being moveable subject to a control parameter, and selectively modifying the control parameter in response to the aerodynamic distortion.

In a further non-limiting embodiment of any of the foregoing example, the calculating of the aerodynamic distortion includes calculating the aerodynamic distortion as a function of angle of attack of the gas turbine engine.

In a further non-limiting embodiment of any of the foregoing examples, the calculating of the aerodynamic distortion includes calculating the aerodynamic distortion as a function of angle of side slip of the gas turbine engine.

In a further non-limiting embodiment of any of the foregoing examples, the calculating of the aerodynamic distortion includes calculating the aerodynamic distortion as a function of an aircraft speed and at least one of angle of attack of the gas turbine engine and angle of side slip of the gas turbine engine.

A further non-limiting embodiment of any of the foregoing examples includes calculating an operating margin as a function of the aerodynamic distortion, comparing the operating margin to a desired operating margin to determine an operating margin difference, and modifying the control parameter in response to the operating margin difference exceeding a predefined difference.

A further non-limiting embodiment of any of the foregoing examples includes calculating a required change in a position of the variable vanes as a function of the operating margin difference.

A further non-limiting embodiment of any of the foregoing examples includes closing the variable vanes to reduce the operating margin difference.

A further non-limiting embodiment of any of the foregoing examples includes suspending any modification of the control parameter if the aircraft is not at a stable flight condition.

A gas turbine engine according to an exemplary aspect of the present disclosure includes an engine inlet and a compressor section in communication with the engine inlet. The compressor section includes variable vanes that are moveable subject to a control parameter. A combustor section is in communication with the compressor section. A turbine section is in communication with the combustor section. A controller is configured to calculate an aerodynamic distortion of air entering the engine inlet and selectively modify the control parameter in response to the aerodynamic distortion.

In a further non-limiting embodiment of any of the foregoing examples, the controller is configured to calculate the aerodynamic distortion as a function of angle of attack of the gas turbine engine.

In a further non-limiting embodiment of any of the foregoing examples, the controller is configured to calculate the aerodynamic distortion as a function of angle of side slip of the gas turbine engine.

In a further non-limiting embodiment of any of the foregoing examples, the controller is configured to calculate the aerodynamic distortion as a function of an aircraft flight condition and at least one of angle of attack of the gas turbine engine and angle of side slip of the gas turbine engine.

In a further non-limiting embodiment of any of the foregoing examples, the controller is configured to calculate an operating margin as a function of the aerodynamic distortion, compare the operating margin to a desired operating margin to determine an operating margin difference, and modify the control parameter in response to the operating margin difference exceeding a predefined difference.

In a further non-limiting embodiment of any of the foregoing examples, the controller is configured to calculate a required change in a position of the variable vanes as a function of the operating margin difference.

In a further non-limiting embodiment of any of the foregoing examples, the controller is configured to suspend any modification of the control parameter in response to a rate of change of an angle of attack of the gas turbine engine exceeding a predetermined rate of change.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
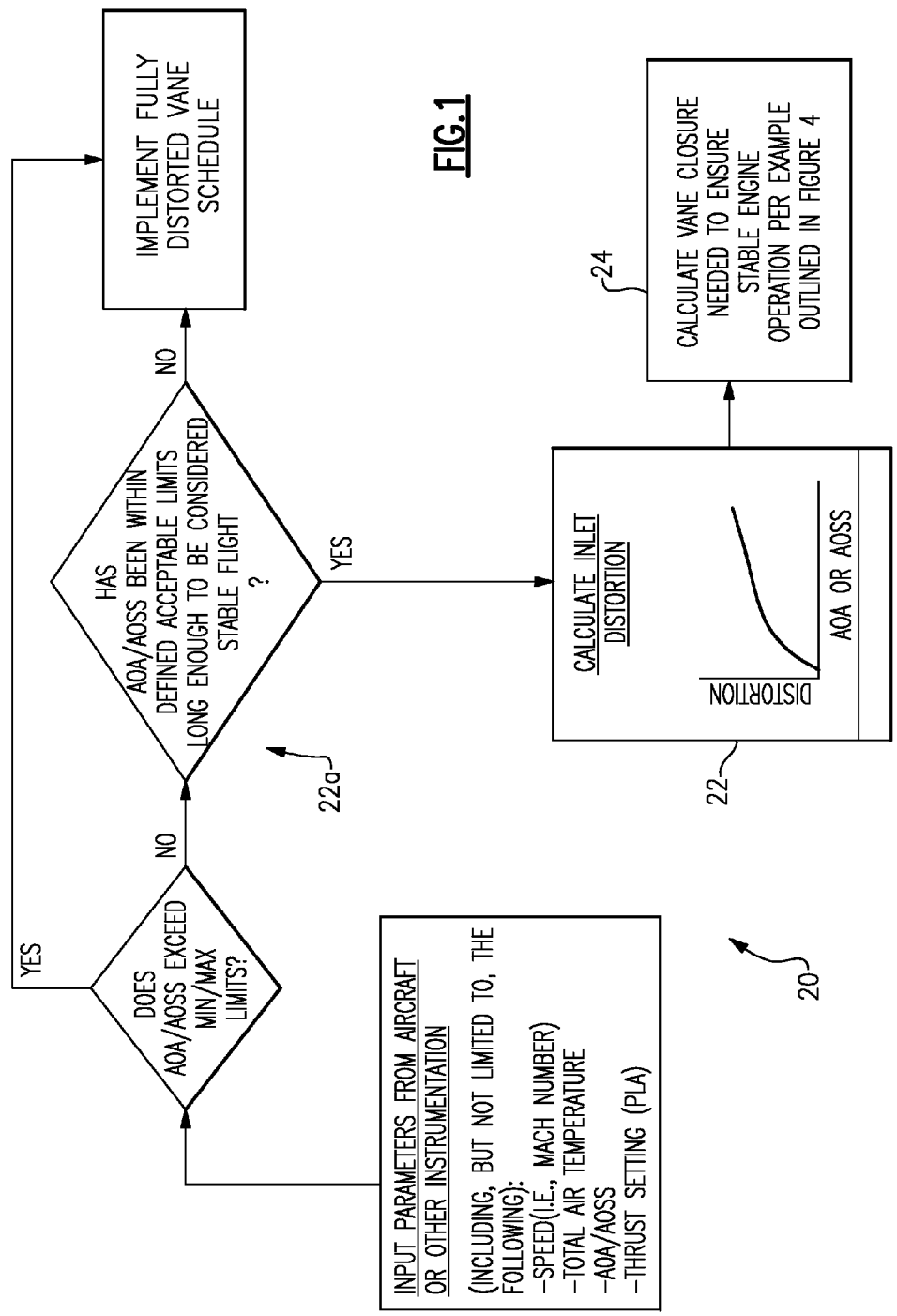
FIG. 1 shows an example method of protecting operating margin of a gas turbine engine subject to inlet distortion generated from angle of attack or angle of sideslip.

FIG. 1 illustrates an example method 20 of protecting operating margin of a gas turbine engine. The operating strategy represented by the method 20 can provide increased operating range of a gas turbine engine, improved fuel efficiency and improvement in engine component life.

As shown, the method 20 generally includes a calculation step 22 and a modification step 24. The calculation step 22 includes calculating an aerodynamic distortion of air entering an inlet of the gas turbine engine, which has a compressor section with variable vanes that are movable subject to a control parameter. Example calculation steps 22a are also shown. The modification step 24 includes selectively modifying the control parameter in response to the aerodynamic distortion.

As an example, the calculating of the aerodynamic distortion includes calculating the aerodynamic distortion as a function of at least one of angle of attack of the gas turbine engine and angle of side slip of the gas turbine engine. Inlet distortion increases in magnitude as an aircraft increases angles of attack (AOA) or sideslip (AOSS), and the airflow separates off the aircraft or engine inlet. If not accounted for in a compressor design, inlet distortion can cause a potentially damaging aerodynamic break-down of the compressor, known as an engine surge. Typical engine controls do not have an indication of the distortion level in real time, and typical compressor vane schedules are therefore set to provide protection against the maximum level of distortion possible.

As an aircraft maneuvers, the angle of attack and the angle of side slip can change relatively rapidly and thus cause aerodynamic distortions in the airflow entering into the inlet of the gas turbine engine. Such aerodynamic distortions can vary from expected predefined values of aerodynamic distortion and thus change an operating margin between a designed operating line and a maximum operating line of the compressor section.

For example, the aerodynamic distortion is calculated as a function of aircraft flight condition (Mach number, altitude, etc.) and angle of attack or angle of side slip. Data representing the aircraft speed and angles of attack or side slip can be provided by an aircraft main controller such that aerodynamic distortion is calculated in real-time or near real time. The given calculated aerodynamic distortion is then used to calculate an operating margin. The operating margin is then compared to a desired operating margin to determine an operating margin difference. If the operating margin difference exceeds a desired operating margin difference, the control parameter of the variable vanes can be modified to reduce the operating margin difference. For example, the variable vanes are moved to a more closed position (see movement M in FIG. 3) to reduce the operating margin difference and reduce instability (represented at S).

To modify the control parameter in response to the aerodynamic distortion, a required change in position of the variable vanes is calculated. For example, the method 20 may include using a table of vane position or angle as a function of change of operating margin. Based upon the table, the variable vanes are moved to a vane position that reduces the operating margin difference. Thus, the strategy employed in the method 20 protects the operating margin to ensure that the engine operates more efficiently and under conditions that improve compressor component life.

Depending upon the type of aircraft, the aircraft may perform maneuvers that result in a high rate of change of the angle of attack or angle of side slip. Under such circumstances it may be undesirable to modify the control parameter and thus move the variable vanes from a previously scheduled position. Thus, in a further example, any modification of the control parameter can be suspended in response to the rate of change of the angle of attack or the angle of side slip exceeding a predetermined threshold rate of change. In this regard, the method 20 may further utilize a stabilization parameter that ensures that the control parameter is not modified in the event that the aircraft could be performing extreme maneuvers.

Figure 2:
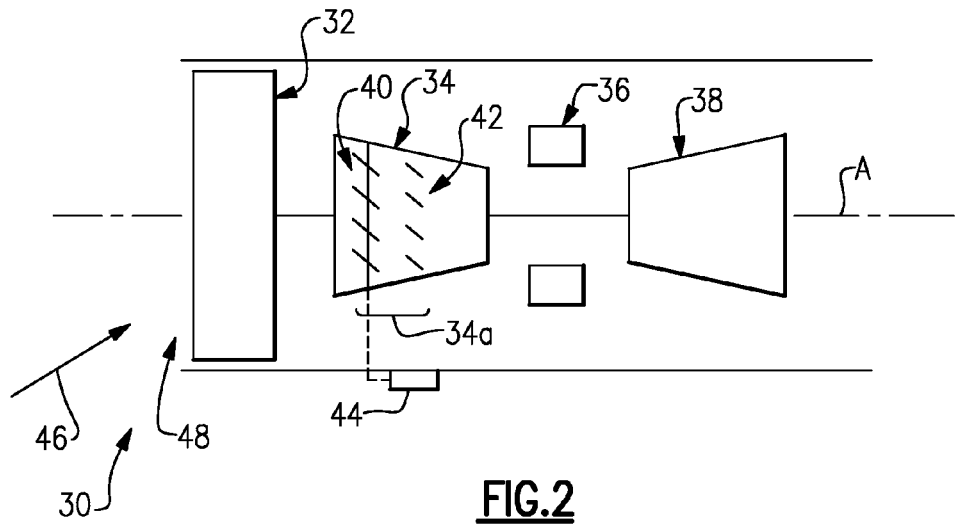
FIG. 2 shows a gas turbine engine that has a controller that is configured to protect operating margin of the gas turbine engine.

FIG. 2 schematically illustrates a gas turbine engine 30 that is configured to utilize the method 20. In this example, the gas turbine engine 30 generally includes a fan section 32, a compressor section 34 in communication with the fan section 32, a combustor section 36 in communication with the compressor section 34 and a turbine section 38 in communication with the combustor section 36. The fan section 32, the compressor section 34, the combustor 36 and the turbine section 38 are generally arranged along an engine central axis A.

As is known, air is received into the engine 30 for compression in the compressor section 34 followed by combustion in the combustor 36 and expansion in the turbine section 38. The turbine section 38 is coupled to the compressor section 34 and the fan section 32 to drive the operation thereof. As can be appreciated, the engine 30 shown in FIG. 2 is depicted schematically for the purposes of this description. It is to understood, however, that the illustrated gas turbine engine 30 configuration can vary and this disclosure will benefit other gas turbine engine configurations as well.

Figure 3:
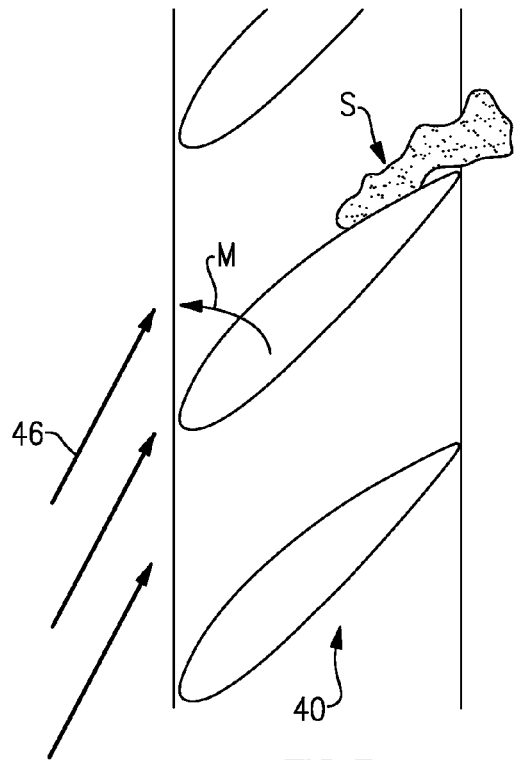
FIG. 3 shows an example variable compressor stator assembly that can be repositioned to maintain operational margin throughout the operational range of the compressor.

The compressor section 34 includes at least one stage 34a of variable compressor vanes 40 and rotatable compressor blades 42. The variable compressor vanes 40 are in communication with a controller 44 for controlling the operation thereof with regard to angular position, as shown in FIG. 3. The controller 44 is configured with hardware, such as a microprocessor, software or both for carrying out the actions of the method 20 described herein.

In operation, the gas turbine engine 30 receives an airflow 46 into the engine 30 through an inlet 48. The controller 44 is configured to calculate an aerodynamic distortion of the airflow 46 entering the engine inlet 48 and selectively modify the control parameter, as described above with regard to the method 20, in response to the aerodynamic distortion.

Figure 4:
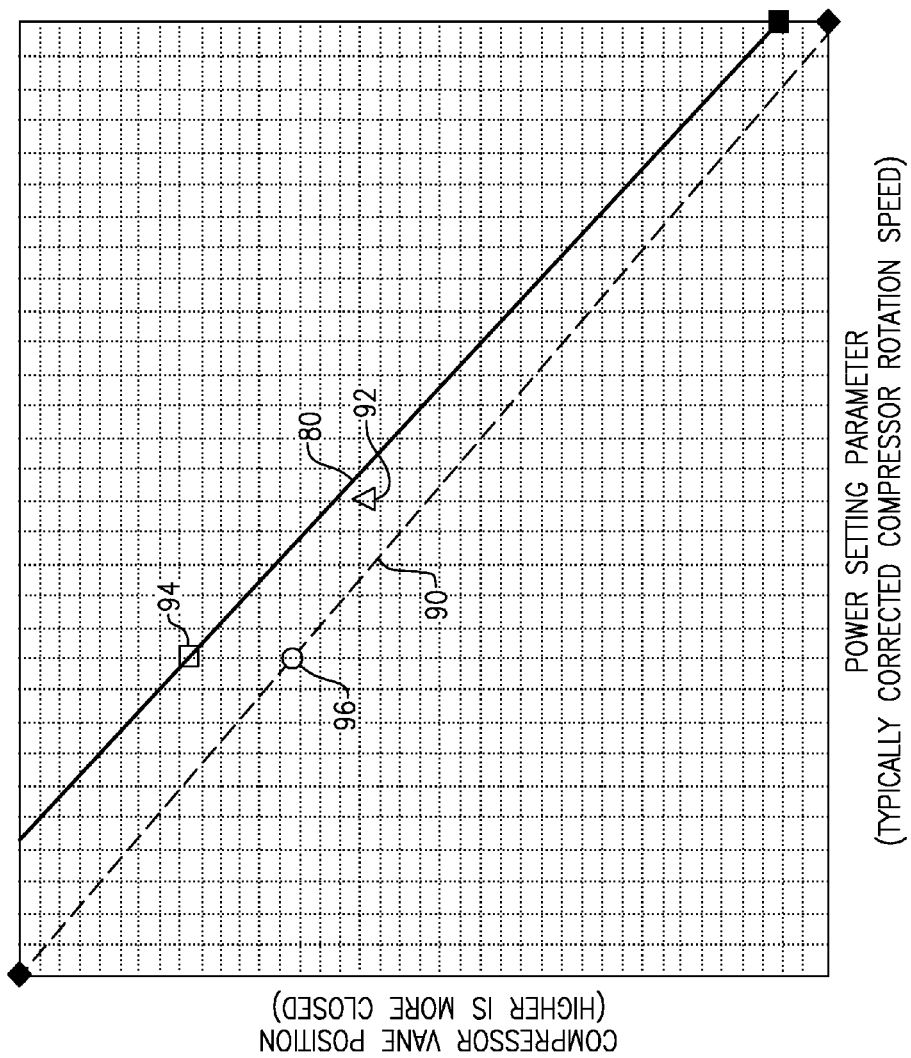
FIG. 4 shows and example calculation of the process to protect an engine from inlet distortion with a supplied measurement of angle of attack and angle of sideslip.

FIG. 4 shows a graph of compressor vane position versus a power setting parameter (e.g., corrected compressor rotation speed) to illustrate an example implementation of the method 20 in an exemplary engine. In the graph, line 80 represents a vane position schedule based on the most extreme operating conditions that an engine is expected to experience, including a most extreme inlet distortion. Line 90 represents a baseline vane position schedule without regard to inlet distortion. Generally, a vertically lower position in the graph provides better fuel economy and component life. Thus, a control strategy that utilizes the most extreme operating conditions for vane scheduling sacrifices fuel economy and component life. The idealized baseline vane position schedule of line 90 represents a best case and thus a maximum possible improvement.

Points 92, 94 and 96 in the graph represent calculated vane positions according to the method 20 disclosed herein for three different flight conditions, as shown in the Table below. Row H in the Table represents the vane position based on the line 80, and row G represents an adjusted vane position based on the method 20 described herein. At row I, the lesser vane position of the vane positions of rows G and H is selected. For Flight Condition 1, the calculated vane position falls between lines 80 and 90, thus yielding a marginal improvement in fuel economy and component life compared to the line 80. For Flight Condition 2, the calculated vane position is on line 80, and thus there is no improvement. For Flight Condition 3, the calculated vane position is on line 90, and thus there is a maximum improvement.

TABLE 1

Example Calculation of Vane Position

| | Calculation Of Worst Case Level of Distortion Possible | Calculation Method | Flight Condition 1[1] | Flight Condition 2[1,2] | Flight Condition 3[1] |
|---|---|---|---|---|---|
| A | Calculate Distortion Level at Given Flight Condition and Current AOA/AOSS: | Table Read | 4 | 10 | 1 |
| B | Buffer for AOA/AOSS Inaccuracy and System Lag: | Constant | 1 | 1 | 1 |
| C | Buffer to Protect Against a Rapid AOA or AOSS Change: | Calculated from the Current Vane Position and the worst case Inlet Distortion Obtainable if there was an extremely rapid Increase in AOA or AOSS. | 4 | 3 | 3 |
| D | Required Level of Protection Needed: | The Summation of Rows A, B, and C | 9 | 14 | 5 |
| E | Units of Protection Provided by Base Schedule: | Base Schedule Calculations | 5 | 7 | 7 |
| F | Shortfall: | Row D-Row E (Can not be less than zero) | 4 | 7 | 0 |
| G | Conversion of Stability Margin Shortfall into Additional Degrees of Vane Closure: | Table Read | 6 (Degs) | 10.5 (Degs) | 0 (Degs) |
| H | Vane Schedule Designed to Protect Worst Case Inlet Distortion or Other Limitations (Such as Flutter Boundaries): | Table Read | 8.75 (Degs) | 10 (Degs) | 10 (Degs) |
| I | Modified Vane Schedule (Relative to Base Schedule): | The lesser of Rows G and H | 6 (Degs) | 10 (Degs) | 0 (Degs) |

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A method of protecting operating margin of a gas turbine engine, the method comprising:
    calculating an aerodynamic distortion of air entering an inlet of a gas turbine engine as a function of at least one of angle of attack and angle of side slip, the gas turbine engine having a compressor section with variable vanes, the variable vanes being moveable subject to a control parameter; and
    selectively modifying the control parameter in response to the aerodynamic distortion.

2. The method as recited in claim 1, wherein the calculating of the aerodynamic distortion includes calculating the aerodynamic distortion as a function of angle of attack of the gas turbine engine, exclusive of angle of side slip.

3. The method as recited in claim 1, wherein the calculating of the aerodynamic distortion includes calculating the aerodynamic distortion as a function of angle of side slip of the gas turbine engine, exclusive of angle of attack.

4. The method as recited in claim 1, wherein the calculating of the aerodynamic distortion includes calculating the aerodynamic distortion as a function of an aircraft speed and at least one of angle of attack of the gas turbine engine and angle of side slip of the gas turbine engine.

5. The method as recited in claim 1, further comprising suspending any modification of the control parameter if the aircraft is not at a stable flight condition.

6. The method as recited in claim 1, further comprising suspending any modification of the control parameter in response to a rate of change of the angle of attack exceeding a predetermined rate of change.

7. The method as recited in claim 1, further comprising suspending any modification of the control parameter in response to a rate of change of the angle of side slip exceeding a predetermined rate of change.

8. The method as recited in claim 1, further comprising calculating an operating margin of the compressor section, with respect to an operating line that is based on a range of pressure ratios and mass airflows, as a function of the aerodynamic distortion, comparing the operating margin to a desired operating margin to determine an operating margin difference, and modifying the control parameter in response to the operating margin difference exceeding a predefined difference.

9. The method as recited in claim 8, including calculating a required change in a position of the variable vanes as a function of the operating margin difference.

10. The method as recited in claim 9, including closing the variable vanes to reduce the operating margin difference.

11. A gas turbine engine comprising:
an engine inlet;
a compressor section in communication with the engine inlet, the compressor section including variable vanes that are moveable subject to a control parameter;
a combustor section in communication with the compressor section;
a turbine section in communication with the combustor section; and
a controller configured to calculate an aerodynamic distortion of air entering the engine inlet as a function of at least one of angle of attack and angle of side slip and selectively modify the control parameter in response to the aerodynamic distortion.

12. The engine as recited in claim 11, wherein the controller is configured to calculate the aerodynamic distortion as a function of angle of attack of the gas turbine engine, exclusive of angle of side slip.

13. The engine as recited in claim 11, wherein the controller is configured to calculate the aerodynamic distortion as a function of angle of side slip of the gas turbine engine, exclusive of angle of attack.

14. The engine as recited in claim 11, wherein the controller is configured to calculate the aerodynamic distortion as a function of an aircraft flight condition and at least one of angle of attack of the gas turbine engine and angle of side slip of the gas turbine engine.

15. The engine as recited in claim 11, wherein the controller is configured to suspend any modification of the control parameter in response to a rate of change of the angle of attack of the gas turbine engine exceeding a predetermined rate of change.

16. The engine as recited in claim 11, wherein the controller is configured to suspend any modification of the control parameter in response to a rate of change of the angle of side slip of the gas turbine engine exceeding a predetermined rate of change.

17. The engine as recited in claim 11, wherein the controller is configured to calculate an operating margin of the compressor section, with respect to an operating line that is based on a range of pressure ratios and mass airflows, as a function of the aerodynamic distortion, compare the operating margin to a desired operating margin to determine an operating margin difference, and modify the control parameter in response to the operating margin difference exceeding a predefined difference.

18. The engine as recited in claim 17, wherein the controller is configured to calculate a required change in a position of the variable vanes as a function of the operating margin difference.

* * * * *